United States Patent
Mills, Jr.

(10) Patent No.: US 6,665,529 B1
(45) Date of Patent: Dec. 16, 2003

(54) SYSTEM AND METHOD FOR AUTHENTICATING A CELLULAR SUBSCRIBER AT REGISTRATION

(75) Inventor: James L. Mills, Jr., San Ramon, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/048,693

(22) Filed: Mar. 26, 1998

(51) Int. Cl.⁷ .............................................. H04M 1/66
(52) U.S. Cl. ...................... 455/411; 455/435; 455/433
(58) Field of Search .............................. 455/411, 410, 455/414, 433, 435, 412; 370/329; 379/58, 60, 59; 395/200, 51

(56) References Cited

U.S. PATENT DOCUMENTS

| | | | | |
|---|---|---|---|---|
| 5,210,787 A | * | 5/1993 | Hayes et al. | 379/60 |
| 5,309,501 A | * | 5/1994 | Kozik et al. | 379/58 |
| 5,329,573 A | * | 7/1994 | Chang et al. | 379/58 |
| 5,375,251 A | * | 12/1994 | Pfundstein | 455/551 |
| 5,467,381 A | * | 11/1995 | Peltonen et al. | 379/58 |
| 5,600,708 A | * | 2/1997 | Meche et al. | 379/59 |
| 5,625,671 A | * | 4/1997 | Salin | 379/58 |
| 5,729,537 A | * | 3/1998 | Billstrom | 370/329 |
| 5,809,413 A | * | 9/1998 | Meche et al. | 455/411 |
| 5,864,757 A | * | 1/1999 | Parker | 455/418 |
| 5,881,235 A | * | 3/1999 | Mills | 395/200.51 |
| 5,918,175 A | * | 6/1999 | Tayloe et al. | 455/427 |
| 5,953,652 A | * | 9/1999 | Amin et al. | 455/410 |
| 5,956,637 A | * | 9/1999 | Ericsson et al. | 455/414 |
| 5,960,416 A | * | 9/1999 | Block | 705/34 |
| 6,091,946 A | * | 7/2000 | Ahvenainen | 455/411 |

FOREIGN PATENT DOCUMENTS

| | | |
|---|---|---|
| EP | 0 690 648 A2 | 1/1996 |
| EP | 0 757 502 A2 | 2/1997 |
| WO | WO 99/49692 * | 9/1999 ............ H04Q/7/38 |

OTHER PUBLICATIONS

Tabbane, S.: *Location Management Methods for Third–Generation Mobile Systems*, IEEE Communications Magazine, vol. 35, No. 8, Aug. 1, 1997.

* cited by examiner

*Primary Examiner*—Daniel Hunter
*Assistant Examiner*—Charles Chow

(57) ABSTRACT

An apparatus for authenticating a subscriber at registration is provided for use in a mobile communications system having at least a switching center communicatible with at least one equipment registry and at least two subscriber registries, wherein, for each system subscriber, data associated with that subscriber is stored at a unique address in one of the subscriber registries. The apparatus includes switching apparatus for requesting and receiving an equipment identity number from a mobile communications device attempting to use the communications system, an equipment registry storing, for each mobile communications device posted with the system, the equipment identity number and the unique address in the subscriber registries of the data associated with that equipment identity number, apparatus for transmitting a received equipment identity number from the switching apparatus to the equipment registry, apparatus for retrieving a unique address associated with the transmitted equipment identity number and transmitting the unique address to the switching apparatus, apparatus for communicating directly with the unique address in the subscriber registries to retrieve data therefrom to the switching apparatus, and apparatus for determining whether to authorize use of the system by the mobile communications device attempting to use the communications system based on the retrieved data.

22 Claims, 6 Drawing Sheets

SYSTEM AND METHOD FOR AUTHENTICATING A CELLULAR SUBSCRIBER AT REGISTRATION

FIELD OF THE INVENTION

The present invention is directed toward a system and method of authenticating a cellular subscriber at registration and, more particularly, toward a system and method of authenticating a cellular subscriber at registration wherein the subscriber's HLR (Home Location Register) address is determined without having to analyze the unique IMSI (International Mobile Subscriber Identity) number associated with that particular subscriber.

BACKGROUND OF THE INVENTION

When a Public Land-Mobile Network (PLMN) requires multiple Home Location Registers (HLRs), either for capacity reasons or for geographical distribution of databases nearer the normal serving Mobile Switching Centers (MSCs) for those subscribers, the addressing is complicated by the fact that both the International Mobile Subscriber Identity (IMSI) number and the Mobile Services International Subscriber Directory Number (MSISDN) must be routable numbers pointing to the same HLR. This is handled in traditional Global Systems for Mobile Communications (GSM) networks by assigning a particular IMSI value after the MSISDN is chosen.

However, in the U.S., the IMSIs are pre-assigned, i.e., already in the SIM (Subscriber Identification Module) chip internal to the cell phone at purchase, and thus the operator has no control over which IMSI a particular subscriber will get. This is a different situation than was envisioned by the original GSM designers when the standards were developed. This problem has been addressed by mapping the MSISDN to the IMSI in the MSCs to allow both numbers to point to the same HLR regardless of the MSISDN value. The relationship between the MSISDN and the IMSI then becomes random, associated only by table data. Subscriptions, however, must still be located in the HLRs based on the IMSI number series.

If the operator does not care which HLR the subscribers are in, e.g., proximity of location does not matter either in length of signalling path or in grouping particular MSISDN series in a particular HLR versus all MSISDN series appearing in all HLRs, then this method is sufficient. However, it still results in overhead for the operator to assure that the IMSI series are manufactured and distributed in a coherent manner.

If the operator does care how subscriptions are distributed among HLRs, then it is not sufficient to just map the MSISDN to the IMSI. In this situation, the entire IMSI will need to be analyzed to determine which HLR a subscriber is in, since subscribers will not be located in particular HLRs based on IMSI number series, but rather particular IMSI numbers. This has resulted in the addition of what are conventionally called enhanced STP (Signal Transferring Point) nodes to traditional GSM systems. The enhanced STP node is basically a conventional STP node modified or enhanced to be capable of analyzing the entire 15-digit IMSI number and/or the entire 10-digit MSISDN number. This enhanced STP node was not necessary when subscribers were assigned to HLRs based on the IMSI number series, as only the first six or seven digits of an IMSI number needed to be analyzed in order to determine which particular HLR a subscriber was in, and conventional STP nodes were capable of such analyzation. In order for the current systems to operatively function, all signalling traffic to the HLRs must be routed through these enhanced STP nodes, causing problems in delay, backlog, and possibly system shutdown should one of these nodes fail.

The present invention is directed towards overcoming one or more of the above-mentioned problems.

SUMMARY OF THE INVENTION

In one aspect of the present invention, a method of authenticating a subscriber at registration is provided for use in a mobile communications system including at least a switching center communicatible with at least one equipment registry and at least two subscriber registries, wherein, for each system subscriber, data associated with that subscriber is stored at a unique address in one of the subscriber registries. The method includes the steps of receiving an equipment identity number at the switching center, the equipment identity number being unique to a particular mobile communications device used by the subscriber, transmitting the equipment identity number to the equipment registry, checking operability status of the particular mobile communications device, transmitting, from the equipment registry to the switching center, the device operability status together with the unique address of data associated with the subscriber authorized to use the particular mobile communications device, retrieving data from the unique address, and authenticating the subscriber based upon the retrieved data.

In one form, the mobile communications device includes a cellular telephone.

In another form, the equipment identity number includes an International Mobile Equipment Identity number unique to each mobile communications device.

In another form, each subscriber registry includes a Home Location Register.

In another form, the equipment registry transmits to the switching center, along with the unique address of data associated with the subscriber authorized to use the particular mobile communications device, the unique address in an authentication center allocated to that subscriber, wherein the authentication center is communicatible with the subscriber registries to provide data associated with the system subscribers thereto.

In another form, the unique authentication center address transmitted by the equipment registry includes an authentication center identifier and a subscriber identity number corresponding to the unique address in the identified authentication center.

In another form, the unique subscriber address transmitted by the equipment registry includes a subscriber registry identifier and a subscriber identity number corresponding to the unique address in the identified subscriber registry.

In another form, the subscriber identity number includes an International Mobile Subscriber Identity number unique to each subscriber.

In another form, the switching center includes a Mobile Switching Center having an associated Visitor Location Register.

In another form, the equipment registry includes an Equipment Identity Register.

In another aspect of the present invention, an apparatus for authenticating a subscriber at registration is provided for use in a mobile communications system having at least a switching center communicatible with at least one equipment registry and at least two subscriber registries, wherein, for each system subscriber, data associated with that subscriber is stored at a unique address and one of the subscriber registries. The apparatus includes switching apparatus for requesting and receiving an equipment identity number from a mobile communications device attempting to use the communications system, an equipment registry storing, for each mobile communications device posted with the system, the equipment identity number and the unique address in the subscriber registries of the data associated with that equipment identity number, apparatus for transmitting a received equipment identity number from the switching apparatus to the equipment registry, apparatus for retrieving a unique address associated with the transmitted equipment identity number and transmitting the unique address to the switching apparatus, apparatus for communicating directly with the unique address in the subscriber registries to retrieve data therefrom to the switching apparatus, and apparatus for determining whether to authorize use of the system by the mobile communications device attempting to use the communications system based on the retrieved data.

In one form, the equipment registry also stores, for each mobile communications device posted with the system, operability status data associated with the equipment identity number. The retrieving apparatus also retrieves the operability status data associated with the transmitted equipment identity number, and, the determining apparatus also determines whether to authorize use of the system based on the retrieved operability status data.

In another form, the equipment registry also stores, for each mobile communications device posted with the system, a unique address in an authentication center allocated to the subscriber. The retrieving apparatus also retrieves the unique address in the authentication center, wherein the authentication center is communicatible with the subscriber registries to provide data associated with system subscribers thereto.

It is an object of the present invention to provide a system and method for authenticating a cellular subscriber while minimizing signalling costs.

It is a further object of the present invention to provide a system and method for authenticating a cellular subscriber while eliminating problems in delay, backlog, and system shutdown due to conventional STP nodes.

It a further object of the present invention to provide a system and method for authenticating a cellular subscriber while maximizing speed and reliability of the system and at the same time simplifying maintenance.

It is yet a further object of the present invention to provide a system and method for authenticating a cellular subscriber providing the advantages identified above utilizing present systems without requiring costly and prohibitive modifications to the many current systems in place.

Other aspects, objects and advantages of the present invention can be obtained from a study of the application, the drawings, and the appended claims.

DETAILED DESCRIPTION OF THE PREFERRED EMBODIMENT

Figure 1:
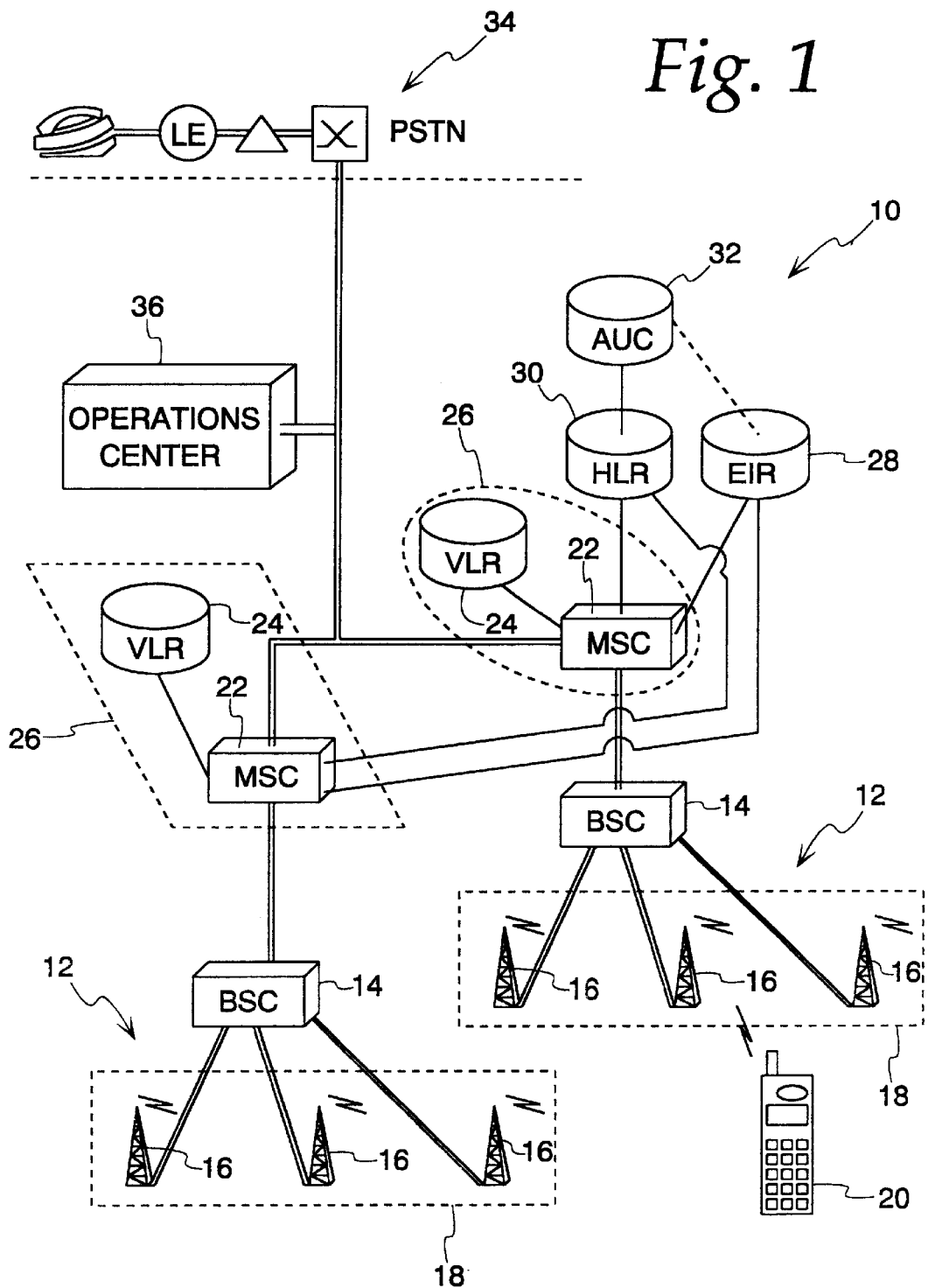
FIG. 1 illustrates the major components of a fixed network supporting a cellular radio system.

FIG. 1 illustrates the major components of a fixed network supporting a cellular radio system, shown generally at 10. For clarity, speech communication between components is indicated with a double line, while signalling communication between components is indicated with a single line. The fixed network 10 includes a Base Station Subsystem (BSS), shown generally at 12, which includes a Base Station Controller (BSC) 14 and several Base Transceiver Subsystems (BTS) 16, with each group 18 of BTSs 16 associated with a particular BSC 14. Each BTS 16 provides a radio cell of one or more channels, with at least one of its radio channels assigned to carry control signals in addition to traffic. The BSC 14 is responsible for the management of the radio resource within a region. The BSCs' main functions are to allocate and control traffic channels, control frequency hopping, undertake handovers (except to cells outside its region), and provide radio performance measurements. Once a Mobile Subscriber (MS) 20, which may include a cellular phone or any other type of mobile communications device, has accessed and synchronized with a BTS 16, the BSC 14 will allocate to it a dedicated bidirectional signalling channel and will set up a route to a Mobile Switching Center (MSC) 22.

The MSC 22 routes traffic and signalling within the network 10 and interworks with other networks. It generally includes a trunk Integrated Services Digital Network (ISDN) exchange with additional functionality and interfaces to support the mobile application. Every MSC 22 has an associated, or co-located, Visitor Location Register (VLR) 24. The VLR 24 is a register associated with the MSC 22 and used by the MSC 22 to obtain and store information needed to handle a call. While the MSC 22 and the VLR 24 were initially standardized in Global Systems For Mobile Communications (GSM) as separate nodes, nearly every manufacturer has essentially merged these nodes and has implemented them as a combined unit. Accordingly, hereafter the combination will be referred to as an MSC/VLR 26.

The fixed network 10 also includes an Equipment Identity Register (EIR) 28, a Home Location Register (HLR) 30, and an Authentication Center (AUC) 32. While not specifically shown in FIG. 1, the fixed network 10 will generally include a plurality of HLRs 30 and AUCs 32, although not necessarily in equal numbers. Each MSC 22 directly communicates with the EIR 28 and every HLR 30 in the network 10. The EIR 28, HLR 30, and AUC 32 are generally utilized for equipment check and authentication operations, which will be described hereafter. The fixed network 10 conventionally communicates with a standard Public Switched Telephone Network (PSTN) 34 under the control of an Operations Center 36, which monitors the communication and administers changes in the data tables controlling communication with the PSTN 34, but does not directly control the communication.

Every cell phone 20 which is sold has associated with it an International Mobile Subscriber Identity (IMSI) number and an International Mobile Equipment Identity (IMEI) number. The IMSI is generally a unique 15-digit subscriber identity number included within the SIM (Subscriber Identity Module) chip internal to the cell phone 20 identifying the individual who purchased the cell phone 20. In GSM-type phones, the SIM chip is removable. The IMEI is a unique 15-digit or more equipment identity number associated with a particular cell phone 20 unit. The IMEI is not the serial number that is stamped on the equipment, but is rather similar to an internal serial number implemented to prevent the use of stolen equipment. The present invention has particular applicability for use with cellular phones having detachable SIM chips, which currently include the GSM-type PCS (Public Communication System) telephones. However, it should be noted that while the Mobile Subscriber 20 is herein generally described with reference to a cell phone, and the method detailed herein is specific to GSM-type networks, the present invention also contemplates use with other digital PCS standards having separate subscriber identities and equipment identities, both stored in the phone or other mobile communication devices.

Figure 2:
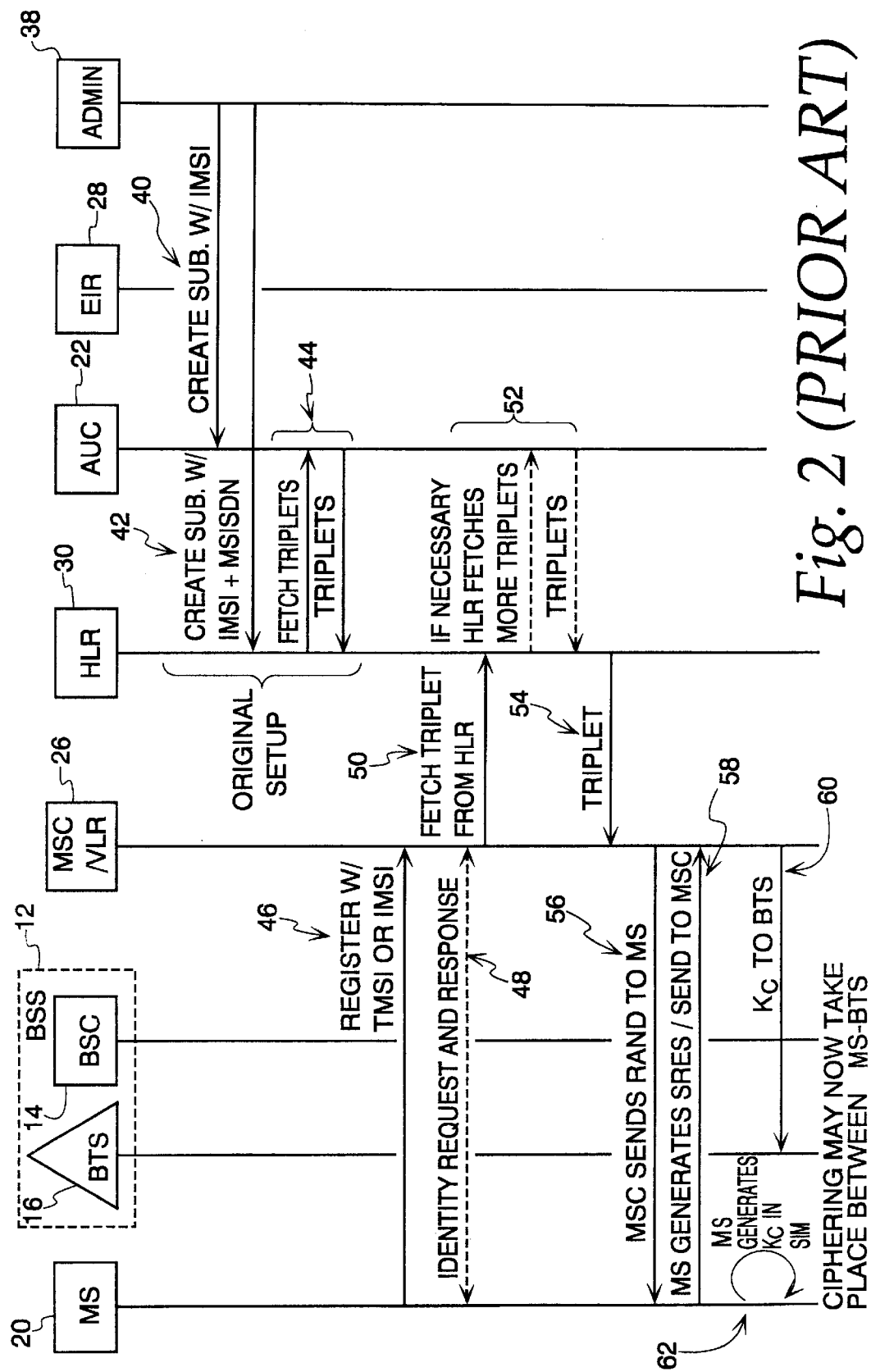
FIG. 2 is a flow diagram illustrating a prior art method of establishing communication via the fixed network.

FIG. 2 is a flow diagram illustrating a prior art method of establishing communication, ie., making a call, via the fixed network 10. Assume a plurality of cell phones 20 are delivered to stores for sale to end consumers/subscribers. Each of the cell phones 20 includes an SIM chip which contains a unique IMSI number. Generally, the last 4–6 digits of the IMSI number identify the series or group of phones. For instance, if ten thousand phones are delivered, the last four digits of the IMSI number may range from 0000–9999. Generally, the first six digits of the IMSI number identify the service provider.

When a group of new cell phones 20 are delivered for sale, an Administration Center 38 within the network 10 is notified and delivered the corresponding IMSI numbers associated with the phones 20. The Administration Center 38 first conventionally creates, at 40, a subscription with just the IMSI number. The Administration Center 38 then conventionally creates, at 42, a subscription in the HLR 30 with the IMSI number plus the Mobile Services International Subscriber Directory Number (MSISDN). The MSISDN is essentially the 10-digit phone number allocated to a particular user/subscriber. It should be noted that these subscriptions are set up prior to a subscriber ever purchasing the cell phone 20 and being assigned a phone number. Accordingly, the original subscription in the HLR 30 is set up with a "dummy" MSISDN in order to allow a first call to go through. However, this is conventional in the art and a detailed description is not necessary.

After the subscription is created in the HLR 30, the HLR 30, at 44, conventionally fetches a plurality of triplets from the AUC 22. The HLR 30 may fetch one or more sets of triplets from the AUC 22, depending on how many the HLR 30 is set up to accept. When more than one set of triplets are fetched, the additional triplets may be stored and subsequently used so that the HLR 30 need not communicate with the AUC 22 every time triplets are needed for authentication purposes. However, more than one set of triplets do not need to be fetched as communication with the AUC 22 can be done each time authentication is required.

A triplet is a set of three data items which are generated by the AUC 22 only at the request of the HLR 30. Triplets are generated specifically for a given IMSI number, and may only be used successfully for that IMSI number. Each triplet consists of the following data items:

1) RAND—a 128-bit random number generated by the AUC 22 every time it produces triplets;
2) SRES—a 32-bit Signed Response generated by the specified version of the A3 or A38 algorithms using RAND and the Subscriber Key (Ki); and
3) Kc—a 64-bit Cipher Key generated by the specified version of the A8 or A38 algorithms using RAND and the Subscriber Key (Ki).

The subscriber Key (Ki) is unique to each subscriber and is installed in the SIM chip in the cell phone 20 and also stored at the subscriber's address in the AUC 32. The Subscriber Key (Ki) is utilized by both the cell phone 20 and the MSC/VLR 26 to generate respective Signed Responses (SRES) and Cipher Keys (Kc). Since the Subscriber Key (Ki) is stored at both locations, it need not be transmitted over the air. It is important for the security of the network that the Subscriber Key (Ki) remain secret and not be transmitted over the air.

It should be further understood that in each triplet, A3 refers to the version number of the algorithm used to generate the Signed Response (SRES); A8 refers to the version number of the algorithm used to generate the Voice Channel Cipher Key (Kc); and A38 refers to the version number of a combined A3 and A8 algorithm. Further it should also be understood that along with the Subscriber Key (Ki), the A3, A8 and A38 algorithms are also provided in the SIM chip of the associated cell phone 20.

After completion of the above-identified steps 40, 42, and 44, commonly referred to as the original setup, the fixed network 10 is ready for a user/subscriber to place a call. Upon initiating a call, the MS 20 registers, at 46, with the MSC/VLR 26 using either a Temporary Mobile Subscriber Identity (TMSI) or an IMSI. The TMSI is essentially a random number assigned by the network 10 to identify a particular subscriber. After a subscriber has registered and authenticated, on subsequent calls, rather than continuing to register with the IMSI, the network 10 assigns a TMSI, which is an arbitrarily assigned number used by the network 10 and MS 20 until another TMSI is assigned by the network 10, or the network 10 purges the TMSI from the system for non-use or some other reason. This aids in preventing theft of the subscriber's IMSI number by minimizing transmission of the IMSI number over the air.

The MSC/VLR 26 periodically purges TMSI numbers that have not been in use for an extended period of time. Thus, if the MS 20 attempts to register with a TMSI that has been purged from the system, the MSC/VLR 26, upon receiving a no longer valid TMSI, will send back an IDENTITY REQUEST at 48, requesting the Mobile Subscriber 20 to forward its IMSI number. The MSC/VLR 26 analyzes the IMSI to determine the subscriber's HLR address, i.e., the particular HLR in which the subscription for the subscriber is located, and then transmits the IMSI to the HLR to essentially "look-up" the subscriber's address and fetch a triplet from the HLR 30, at 50. As shown at 52, if necessary, the HLR 30 fetches more triplets from the AUC 22, and forwards a triplet to the MSC/VLR 26 at 54. Fetching triplets at 42 may be necessitated by the fact that the HLR 30 had not previously stored triplets for use or had simply run out of stored triplets, since each time a subscriber is authenticated, one of the sets of triplets is removed from the HLR 30 for authentication purposes.

Upon receiving the triplet, the MSC/VLR 26, at 56, sends the random number (RAND) to the MS 20. The MS 20, at 58, generates, in its SIM chip, a Signed Response (SRES) from the random number (RAND), and sends the generated SRES back to the MSC/VLR 26. The MSC/VLR 26 then compares the SRES sent from the MS 20 with the SRES already stored as part of the triplet, and only if they are equal will the MS 20 be authenticated so the MSC/VLR 26 will allow the call to go through.

Assuming the MSC/VLR 26 verifies the authentication of the MS 20, i.e., allows a call to go through, the MSC/VLR 26, at 60, transmits the Cipher Key (Kc), already stored as part of the triplet, to the BTS 16. This Cipher Key (Kc) is also, at 62, internally generated in the SIM chip in the MS 20 from the RAND required from the MSC/VLR 26 and the stored Subscriber Key (Ki) and A8/A38 algorithms for speech ciphering. Thus, the cipher Key (Kc) need not be transmitted over the air, further adding to the security features. Since the Cipher Key (Kc) is now located at both ends of the air interface, i.e., at the MS 20 and the BTS 16, ciphering may now take place between the MS 20 and BTS 16 to provide security for over the air transmissions between the MS 20 and BTS 16.

Figure 3:
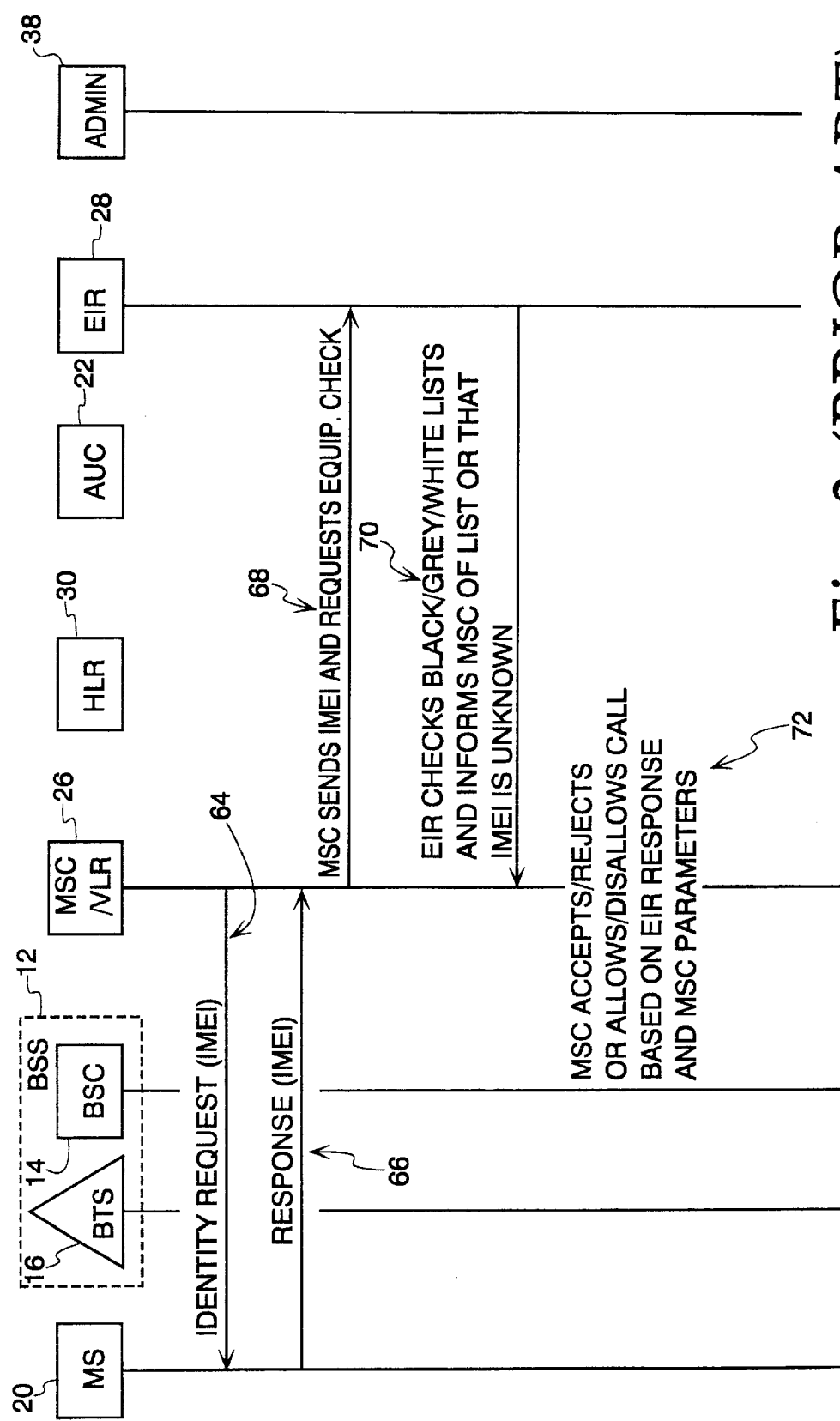
FIG. 3 is a flow diagram illustrating a prior art method of performing an equipment check via fixed network.

Once authentication is complete, an equipment check is done as shown in the flow diagram of FIG. 3. It should be noted that an equipment check does not necessarily have to be done every time a subscriber registers, but may be preset to initiate every third, fifth, etc., time the subscriber registers.

The MSC/VLR 26, at 64, transmits an IDENTITY REQUEST to the MS 20 requesting its IMEI number. The MS 20, at 66, transmits its IMEI number to the MSC/VLR 26, which is now encrypted since ciphering has begun. The MSC/VLR 26, at 68, transmits the IMEI to the EIR 28 and requests an EQUIPMENT CHECK. The EIR 28 then checks its black, gray, and white lists and informs, at 70, the MSC/VLR 26 of the list in which the IMEI was found, or that the IMEI is unknown. The black list is essentially a list of all phones or handsets that are invalid for some reason, e.g., stolen. The gray list is essentially a list of all phones or handsets having some particular problem, but they are not necessarily listed as a bad or invalid phone. The white list is essentially a list of all phones that are specifically approved for use within the network 10. However, if a phone is not included in the white list, it is considered unknown and it gets treated the same as a phone included in the white list. Thus, particular phones that are good do not need to be listed; only the phones that are bad or invalid need to be listed.

The MSC/VLR 26, at 72, then accepts/rejects or allows/disallows the call based on the EIR 28 response and/or MSC/VLR 26 parameters (for example, if the particular phone had been reported as stolen, i.e., black listed, or if the subscriber is attempting to utilize a particular feature not included in the subscription, the MSC/VLR 26 will reject/disallow the call).

Figure 4:
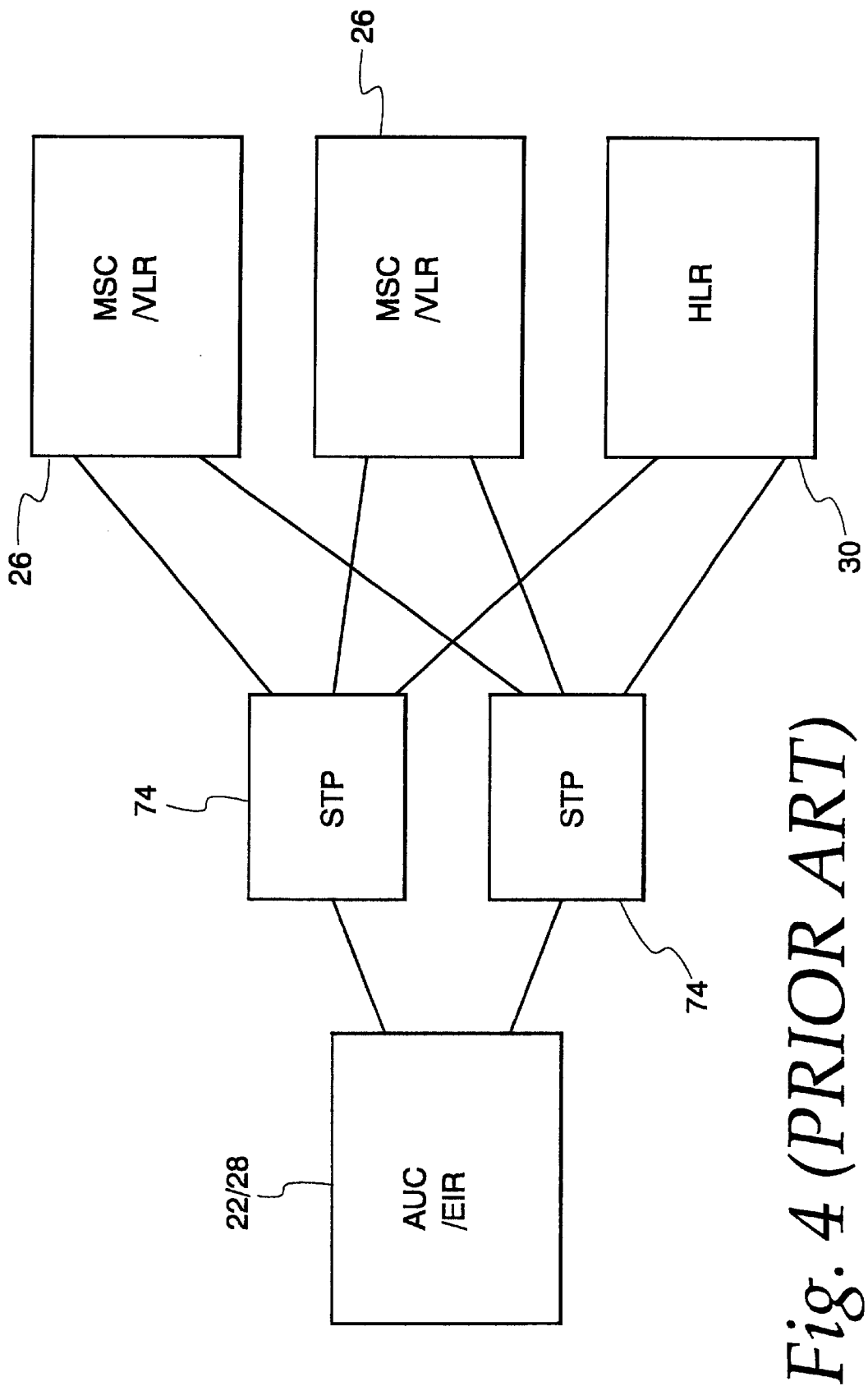
FIG. 4 is a block diagram of the major components of a prior art fixed network.

It is important to recognize that in the above-described method, communication between the various components does not occur directly. More specifically, as shown in FIG. 4, communication between the MSC/VLR 26, the HLR 30, the AUC 22, and the EIR 28 are routed through STP (Signal Transferring Point) nodes 74. If both the IMSI and the MSISDN numbers are randomly chosen, the network 10 is then forced to analyze the entire 15-digit IMSI and/or 10-digit MSISDN to determine the subscriber's HLR address. Since conventional STP nodes 74 were designed to perform only 6 or 7-digit analyzation, one or more of these STP nodes 74 must be enhanced to do 10 or 15-digit analyzation.

While it is possible for network operators to distribute HLR subscriptions based on the IMSI number series, and thus do not have the problem of analyzing the entire 15-digit IMSI number, such operators are unable to optimally locate the HLR subscriptions.

While it is theoretically possible to have the entire network do the complete analysis, it is extremely impractical due to the requirements of synchronizing and storing the routing data in all nodes; accordingly, the enhanced STP nodes have been provided to do this translation. Thus, all signalling traffic within the network must be routed through these enhanced STP nodes to ensure network operability. This not only adds additional steps in the authentication process, but also may cause problems such as backlog, delay, disconnections, etc., in high traffic networks, and may run the potential of system shutdown should one or more of these enhanced STP nodes fail. Further, these enhanced STP nodes require greater monitoring and maintenance than the conventional STP nodes, and must have identical data (i.e., the HLR address for all the subscribers in the network) since each enhanced STP node may be called upon to communicate with each HLR within the network.

The present invention does away with the additional requirements of the enhanced STP nodes and essentially combines the authentication process with the equipment check. The present invention has particular utility at the registration of the mobile subscriber 20 (i.e., when the phone is first turned on).

Figure 5A:
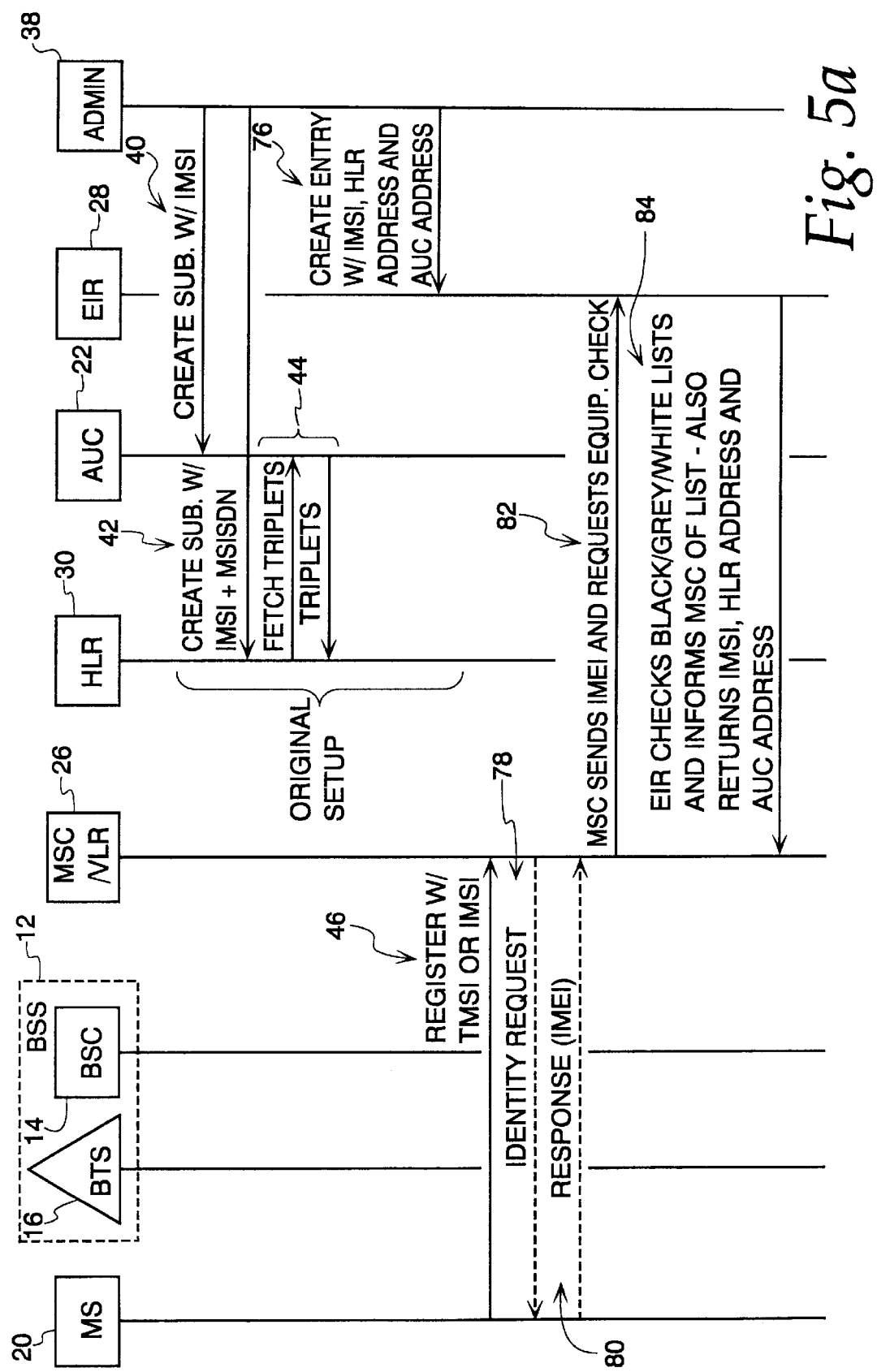
FIGS. 5a–5b are a flow diagram illustrating the authentication and equipment check method according to the present invention.
Figure 5B:
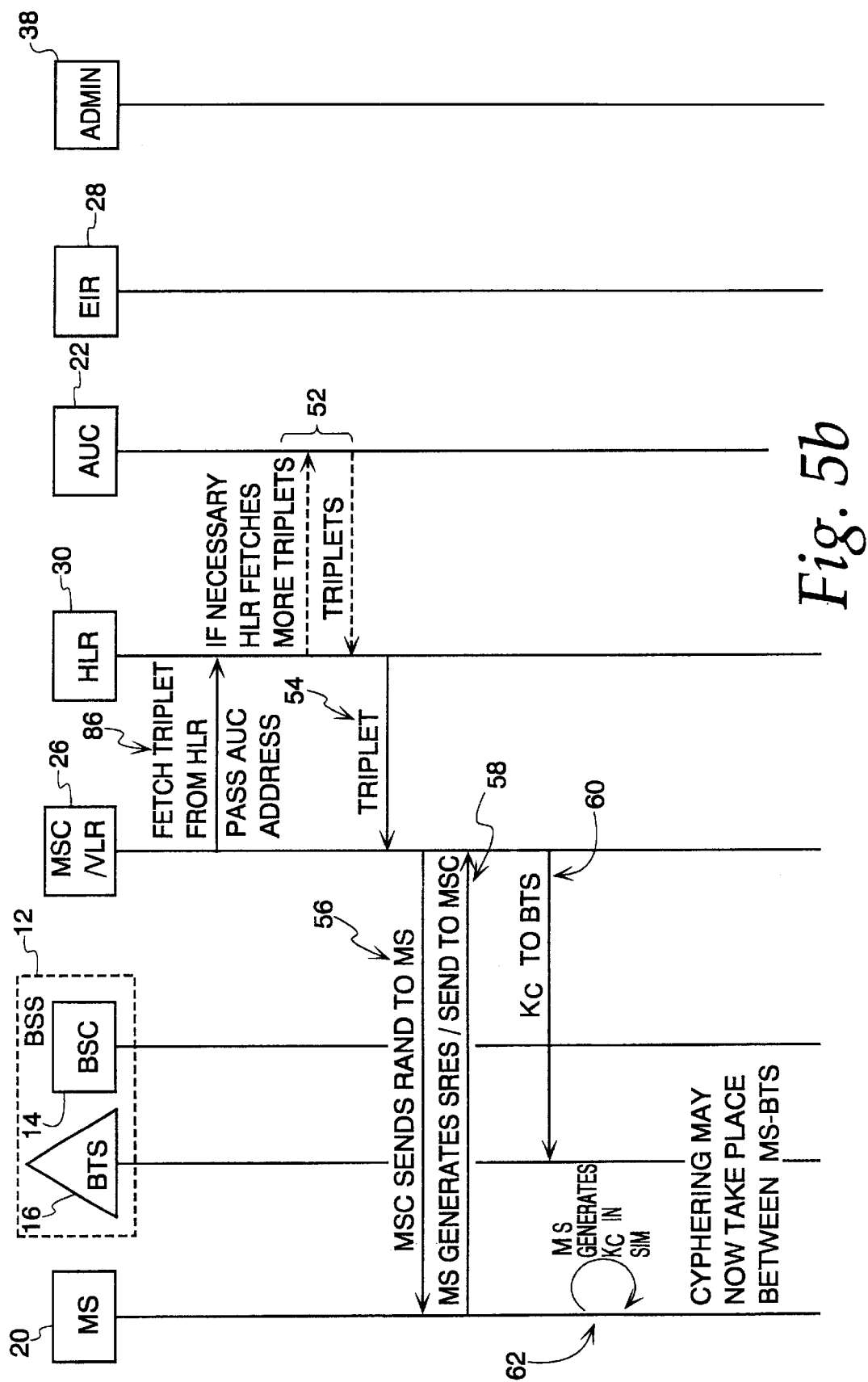

FIGS. 5*a*–5*b* are a flow diagram illustrating the present invention.

The original setup is essentially the same as the original setup previously described with respect to FIG. 2, except that the administration center 38, at 76, now creates an entry in the EIR 28 for each individual phone using the IMEI number. Each entry includes the IMSI number associated with that particular phone (IMEI), and the corresponding HLR and AUC addresses, i.e., the particular HLR or AUC in which the subscriber's subscription is located. It should be noted that in a system having eight or less combined HLR/AUCs, three additional binary bits is all that is needed to distinguish between the eight different locations. Similarly, four binary bits would distinguish sixteen different locations, etc. However, the size of the data field is not a primary concern, as the entry could contain an actual address or an index to the actual address.

Upon initiation of a call, the Mobile Subscriber 20, at 46, registers with the MSC/VLR 26 using a TMSI or an IMSI number as previously described. If the received TMSI or IMSI number is not recognized at the MSC/VLR 26 (e.g., the TMSI or IMSI number was purged, or it could be a new subscription with the very first registration), the MSC/VLR 26, at 78, sends an IDENTITY REQUEST to the MS 20 requesting the IMEI, and the MS 20, at 80, responds to the IDENTITY REQUEST by transmitting the IMEI to the MSC/VLR 26.

Upon receiving the IMEI, the MSC/VLR 26, at 82, transmits the IMEI directly to the EIR 28 and requests an EQUIPMENT CHECK. The EIR 28, at 84, checks the black, gray, and white lists as previously described and informs the MSC/VLR 26 of the list in which the IMEI was found. The EIR 28 also, at 84, returns the IMSI number, the HLR address, and the AUC address to be maintained at the MSC/VLR 26 unless or until thereafter purged according to normal MSC/VLR 26 protocol.

The MSC/VLR 26, at 86, then transmits the IMSI to the appropriate HLR 30 determined from the HLR address and fetches a triplet from the HLR 30 (FIG. 5*b*) and passes the AUC address received from the EIR 28 to the HLR 30. More particularly, the HLR 30 receives the IMSI and determines the subscriber's address from a look-up table or other conventional means. As previously described, if necessary, at 52, the HLR 30 fetches more triplets from the AUC 22 using the AUC address and the IMSI. The HLR 30 transmits, at 54, a triplet to the MSC/VLR 26 as previously described, and the rest of the authentication procedure, namely, steps 56, 58, 60, and 62, occurs as previously described with respect to FIG. 2.

With the present invention, the dependency of the HLR address and the AUC address on the IMSI number series is broken, and it is possible to map the subscriptions in the AUC directly to the HLR. Since the HLR address is not dependent on the IMSI number series, an HLR locally situated with respect to a subscriber could always be chosen to store that particular subscriber's subscription. Further, the proposed approach alleviates the requirement of additional STP nodes, which are required to translate the entire 15-digit IMSI and 10-digit MSISDN numbers when the HLR chosen to store the subscription is based (as preferred) on location rather than the IMSI number.

The present invention may be implemented in present systems without requiring costly and prohibitive modifications to the many current systems in existence. Implementation of the present invention reduces signalling costs and simplifies maintenance of the system (by at least removing the additional enhanced STP nodes) while at the same time maximizing speed and reliability of the system. Problems such as delay, backlog and system shutdown, previously experienced as a result of the additional STP nodes, are minimized. This may in turn increase user satisfaction resulting in increased business, recognition, etc.

While the invention has been described with particular reference to the drawings, it should be understood that various modifications could be made without departing from the spirit and scope of the present invention.

What is claimed is:

1. In a mobile communications system including at least a switching center communicatible with at least one equipment registry and at least two subscriber registries wherein, for each system subscriber, data associated with that subscriber is stored at a unique address in one of the subscriber registries, a method of authenticating a subscriber at registration comprising the steps of:

receiving an equipment identity number at the switching center, the equipment identity number being unique to a particular mobile communications device used by the subscriber;

transmitting the equipment identity number to the equipment registry;

checking operability status of the particular mobile communications device;

transmitting, from the equipment registry to the switching center, the device operability status together with the unique address of data associated with the subscriber authorized to use the particular mobile communications device;

retrieving data from the unique address; and authenticating the subscriber based upon the retrieved data.

2. The method of claim 1, wherein the mobile communication device comprises a cellular telephone.

3. The method of claim 1, wherein the equipment identity number comprises an International Mobile Equipment Identity number unique to each mobile communications device.

4. The method of claim 1, wherein each subscriber registry comprises a Home Location Register.

5. The method of claim 1, wherein the equipment registry transmits to the switching center, along with the unique address of data associated with the subscriber authorized to use the particular mobile communications device, a unique address in an authentication center allocated to that subscriber, wherein the authentication center is communicatible with the subscriber registries to provide data associated with system subscribers thereto.

6. The method of claim 5, wherein the unique authentication center address transmitted by the equipment registry comprises an authentication center identifier and a subscriber identity number corresponding to the unique address in the identified authentication center.

7. The method of claim 6, wherein the subscriber identity number comprises an International Mobile Subscriber Identity number unique to each subscriber.

8. The method of claim 1, wherein the unique subscriber address transmitted by the equipment registry comprises a subscriber registry identifier and a subscriber identity number corresponding to the unique address in the identified subscriber registry.

9. The method of claim 8, wherein the subscriber identity number comprises an International Mobile Subscriber Identity number unique to each subscriber.

10. The method of claim 1, wherein the switching center comprises a Mobile Switching Center having an associated Visitor Location Register.

11. The method of claim 1, wherein the equipment registry comprises an Equipment Identity Register.

12. In a mobile communications system having at least a switching center communicatible with at least one equipment registry and at least two subscriber registries wherein, for each system subscriber, data associated with that subscriber is stored at a unique address in one of the subscriber registries, an apparatus for authenticating a subscriber at registration comprising:

switching means for requesting and receiving an equipment identity number from a mobile communications device attempting to use the communications system;

an equipment registry storing, for each mobile communications device posted with the system, the equipment identity number and the unique address in the subscriber registries of the data associated with that equipment identity number;

means for transmitting a received equipment identity number from the switching means to the equipment registry;

means for retrieving the unique address associated with the transmitted equipment identity number and transmitting the unique address to the switching means;

means for communicating directly with the unique address in the subscriber registries to retrieve data therefrom to said switching means; and means for determining whether to authorize use of the system by the mobile communications device attempting to use the communications system based on the retrieved data.

13. The apparatus of claim 12, wherein:

said equipment registry also stores, for each mobile communications device posted with the system, operability status data associated with its equipment identity number, said retrieving means also retrieves the operability status data associated with the transmitted equipment identity number, and said determining means also determines whether to authorize use of the system based on the retrieved operability status data.

14. The system of claim 12, wherein each subscriber registry comprises a Home Location Register.

15. The system of claim 12, wherein the equipment registry comprises an Equipment Identity Register.

16. The system of claim 12, wherein the equipment identity number comprises an International Mobile Equipment Identity number unique to each mobile communications device.

17. The system of claim 12, wherein:

said equipment registry also stores, for each mobile communications device posted with the system, a unique address in an authentication center allocated to that subscriber, and said retrieving means also retrieves the unique address in the authentication center, wherein the authentication center is communicatible with the subscriber registries to provide data associated with system subscribers thereto.

18. The system of claim 17, wherein the unique address in the authentication center retrieved by the retrieving means comprises an authentication center identifier and a subscriber identity number corresponding to the unique address in the identified authentication center.

19. The system of claim 18, wherein the subscriber identity number comprises an International Mobile Subscriber Identity number unique to each subscriber.

20. The system of claim 12, wherein the mobile communications device comprises a cellular telephone.

21. The system of claim 12, wherein the unique address in the subscriber registries retrieved by the retrieving means comprises a subscriber registry identifier and a subscriber identity number corresponding to the unique address in the identified subscriber registry.

22. The system of claim 21, wherein the subscriber identity number comprises an International Mobile Subscriber Identity number unique to each subscriber.

* * * * *